United States Patent [19]
Thiery et al.

[11] 3,936,118
[45] Feb. 3, 1976

[54] COUPLING FOR FLEXIBLE PIPE PROVIDED WITH REINFORCING ARMOURINGS

[75] Inventors: Jean Thiery, Le Pecq; André Chevalier, Pantin, both of France

[73] Assignee: Institut Francais du Petrole, France

[22] Filed: May 3, 1974

[21] Appl. No.: 466,851

[30] Foreign Application Priority Data
May 14, 1973 France .............................. 73.17436

[52] U.S. Cl. ................ 339/16 R; 285/149; 285/297
[51] Int. Cl.² ...................... H01R 3/04; F16L 39/02
[58] Field of Search ............ 285/149, 297; 403/268, 403/267, 266, 265; 339/16 R; 138/109, 129, 130

[56] References Cited
UNITED STATES PATENTS

| | | | |
|---|---|---|---|
| 2,473,441 | 6/1949 | Muller | 285/149 X |
| 3,004,779 | 10/1961 | Cullen et al. | 285/149 X |
| 3,217,282 | 11/1965 | Chevalier et al. | 285/149 X |
| 3,415,545 | 12/1968 | Frey et al. | 285/149 |
| 3,531,143 | 9/1970 | Horvath et al. | 285/149 X |
| 3,667,112 | 6/1972 | Chevalier et al. | 285/149 X |

FOREIGN PATENTS OR APPLICATIONS

| | | | |
|---|---|---|---|
| 1,458,100 | 10/1966 | France | 285/149 |
| 625,446 | 9/1961 | Italy | 285/149 |

Primary Examiner—Thomas F. Callaghan
Attorney, Agent, or Firm—Craig & Antonelli

[57] ABSTRACT

This coupling houses nail-shaped anchoring means having preferably a jagged profile, which are inserted between adjacent reinforcing elements of the pipe armouring.

A solidifiable material binds these nail-shaped anchoring means and the reinforcing elements of the pipe armouring firmly together.

32 Claims, 9 Drawing Figures

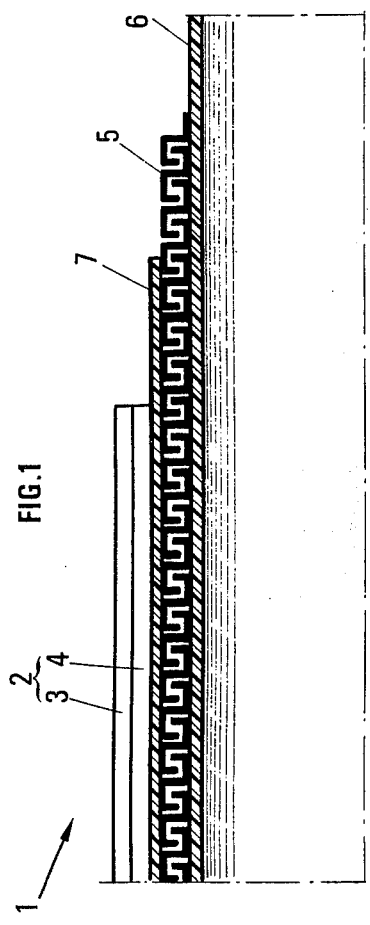
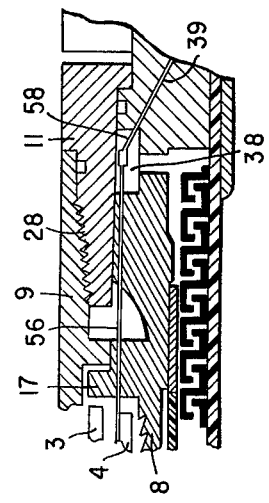
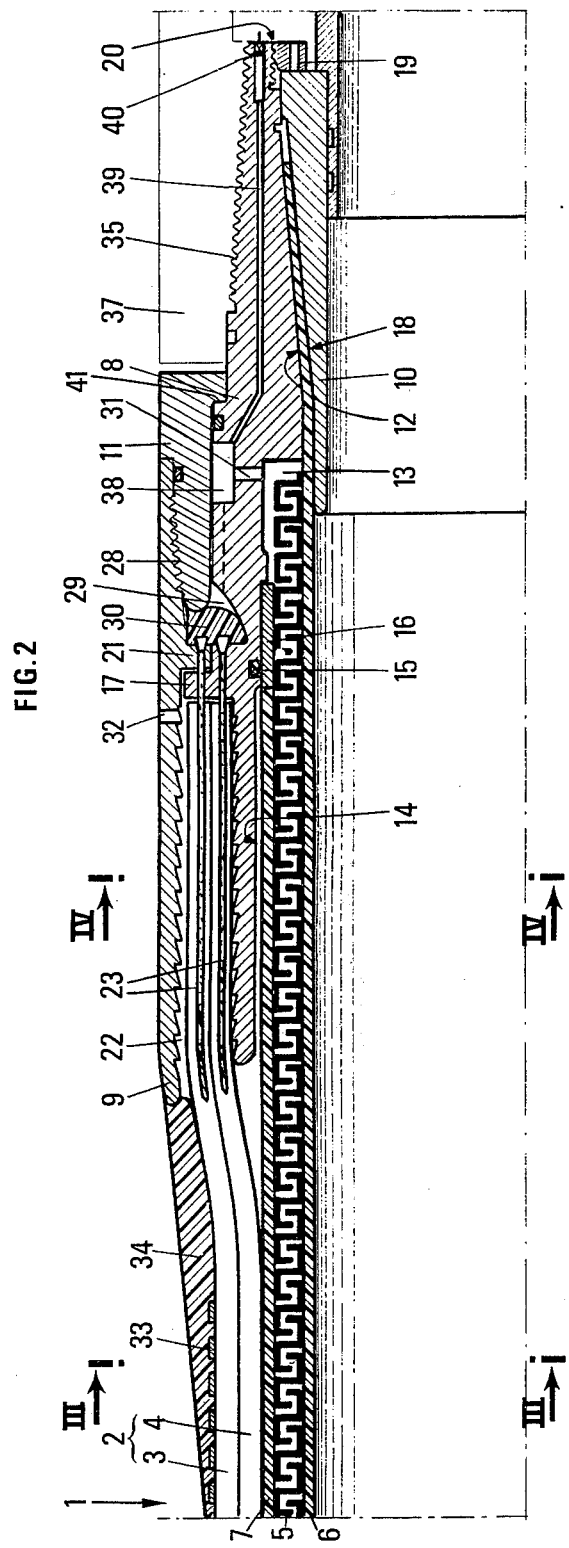

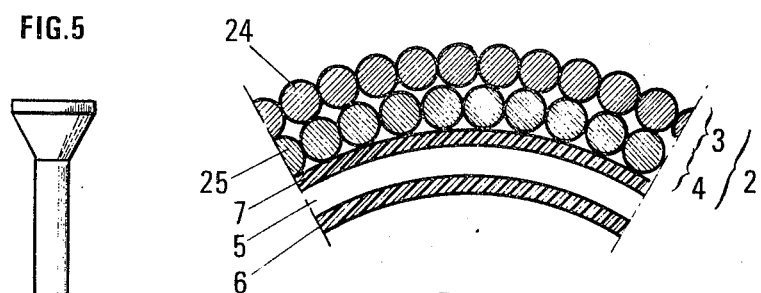
FIG.3A
FIG.3B
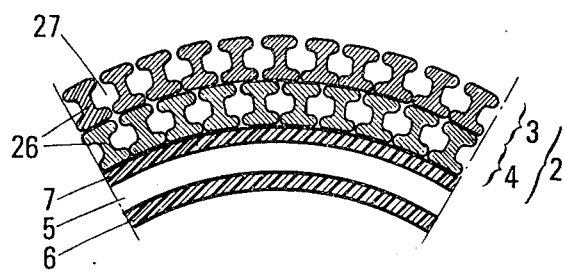
FIG.5
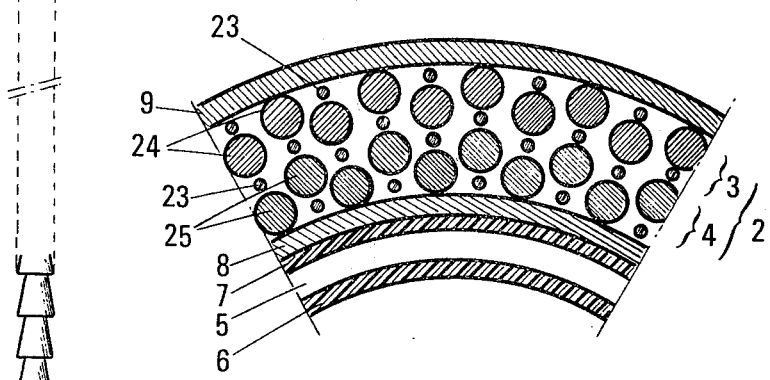
FIG.4A
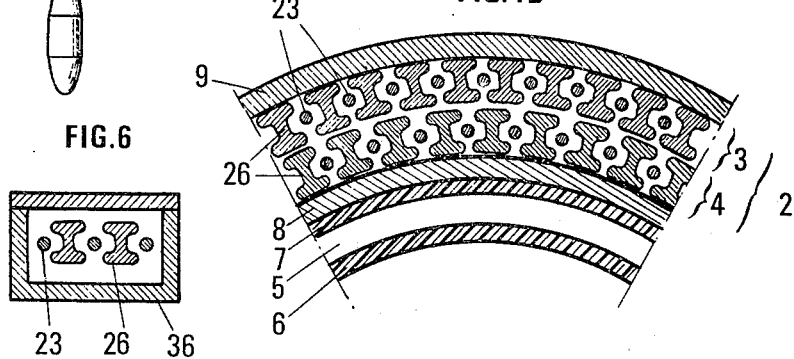
FIG.4B
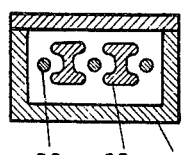
FIG.6

COUPLING FOR FLEXIBLE PIPE PROVIDED WITH REINFORCING ARMOURINGS

The present invention relates to a coupling for a flexible pipe provided with reinforcing armouring.

Most conventional couplings for such pipes comprise body members provided with at least one recess wherein are inserted the ends of the reinforcing armourings of the flexible pipe. The mechanical connection between the coupling and the armourings is achieved by injecting into this recess a solidifiable material which fills the free spaces between coupling and armouring layers.

As it is well known to those skilled in the art, the resistance to mechanical stresses of such a connection depends mainly on the size of the surfaces of the armourings and of the couplings to which the solidifiable material adheres, the profile of these surfaces, the nature and mechanical characteristics of the solidifiable material, etc...

In order to realize couplings having an external diameter which is not very different from that of the flexible pipe, it is necessary to increase the length of these couplings in proportion to the mechanical stresses supported by the pipe, so as to increase the surfaces of the armourings and of the coupling to which the solidifiable material is adherent.

It results therefrom, at the place of the couplings, a substantial reduction in the flexibility of a flexible pipe formed of different sections connected end to end.

With a view not to excessively increase the length of the couplings, the latter are so constituted that the external elements of the pipe (which are generally formed by its traction-withstanding armourings) have a length which is greater than that of the internal elements of the pipe (internal tightening tube, pressure resisting armouring).

When securing the coupling to the pipe, it is necessary to partially unwind the convolutions formed by the external reinforcing elements, so as to cut at the right length the innermost elements of the pipe, and then to correctly position again these outer reinforcing elements. Such operations are time consuming and difficult.

Moreover, when the coupling is secured to one end of the pipe, it becomes difficult, if not impossible, to gain access to the internal elements of the flexible pipe, particularly with a view to complete the tightening between the coupling and the internal tightening sheath.

An object of the present invention is accordingly to provide a coupling which can be secured to one end of a flexible pipe provided with reinforcing armourings, this coupling being of substantially smaller size than prior art couplings and being easily assembled, while providing at the place of this coupling, for an easy access to the different elements of the flexible pipe.

The invention will be properly understood and advantages thereof will clearly appear from the following description illustrated by the accompanying drawings wherein:

FIG. 1 is a diagrammatic half cross-section of a type of flexible pipe at one end of which the coupling according to the invention is to be secured, FIG. 2 is an axial cross-sectional view of a nonlimitative embodiment of the coupling of the invention secured to the end of the flexible pipe, FIGS. 3 A and 3 B are partial cross-sectional views along line III—III of FIG. 2, showing two types of traction-withstanding armourings, FIGS. 4 A and 4 B are partial sectional views along line IV—IV of FIG. 2, corresponding to each type of the pressure-withstanding armourings illustrated in FIGS. 3 A and 3 B, FIG. 5 illustrates a preferred embodiment of the elongated anchoring elements, FIG. 6 illustrates a testing device for showing the importance of these anchoring devices and of their design, and FIG. 7 is a view similar to FIG. 2 showing a portion of the inventive coupling when the flexible pipe includes an electrical conductor.

FIG. 1 diagrammatically shows a cross-sectional view of a flexible pipe provided with reinforcing armourings, at one end of which a coupling has to be secured.

The flexible pipe, which, as a whole, is designated by reference numeral 1, may be of any known type and comprises at least one armouring 2 capable of withstanding tractive and/or torsional stresses applied to pipe 1.

In the illustrated embodiment, this armouring 2 is formed of two layers 3 and 4 of wires, strands, flat or profiled strips, helically wound in opposite directions with large winding pitches.

The pipe illustrated by FIG. 1 furthermore comprises:

a tubular armouring 5, housed inside the traction-withstanding armouring and capable of withstanding the difference between the internal and external pressures to which pipe 1 is subjected. This pressure withstanding armouring may, in particular, be constituted by the helical winding of a strip having a Z- or S- shaped cross-section forming adjacent convolutions with a small winding pitch, a flexible, tight sheath or tubular core 6, inside the pressure-withstanding armouring 5, providing for the internal tightness of the flexible pipe 1, a flexible, tight tubular sheath 7 placed between the pressure-withstanding armouring 5 and the traction-withstanding armouring 2, this sheath 7 preventing crushing of the tubular core 6 under the action of the pressure prevailing outside pipe 1.

The sheaths 6 and 7 may be made of a material, such as a plastomer or an elastomer, selected for its mechanical properties and its resistance to the chemical action of the products with which it is in contact (such as, for example, the fluid flowing through the flexible pipe 1).

A tight sheath, not illustrated in FIG. 1, may be used in order to ensure the external tightness of the pipe.

This last-mentioned sheath may cover the traction-withstanding armouring 2 or be embedded therein.

Prior to securing the coupling at the end of pipe 1, each of the elements constituting this pipe has been cut to the suitable length, as illustrated by FIG. 1. It should be noted that each element is longer than the surrounding element. Such cutting operations can be achieved from the exterior of the pipe and are therefore easily performed, without any need of unwinding the external windings for gaining access to the innermost elements, as this was the case with prior art couplings.

FIG. 2 is a half axial cross-sectional view of the coupling according to the invention secured to the end of the flexible pipe 1.

The main elements which form this coupling are constituted by the body member 8 of the coupling, the anchoring ring or external casing 9, an tubular internal tightening bevelled plug member 10 and an external ring 11, whose object will be made apparent hereinafter.

The body member 8 of the coupling has a tubular shape and comprises a first bore 12, of conical shape, in which is inserted the uncovered end of the external sheath 6, a second bore 13, of cylindrical shape, in which the pressure withstanding armouring 5 is placed, with a substantial clearance, and a third bore 14 which is adapted to house the end of the sheath 7. Tightening means, such as an annular gasket 15, provide for tightness between the body 8 of the coupling and the sheath 7.

In the illustrated embodiment, the sheath 7 is made of an elastomer and the gasket 15 ensures the tightness by cooperating with a metal ring 16 secured at the end of sheath 7, for example through vulcanizing.

At the level of the bore 14, the body of the coupling has the shape of a tubular bevelled plug member of determined length which is inserted between the traction-withstanding armouring 2 and the element constituting the flexible pipe which is immediately inside the armouring 2, this insertion being achieved with a slight flaring of the layers 3 and 4 of wires, strands, flat or profiled strips forming the armouring 2, until the ends of these layers are in close vicinity to a shoulder 17 of the body member 8, i.e. until the armouring covers substantially the whole end of the body member 8 having the shape of a bevelled tubular plug member.

The bore 1 houses the sealing ring 10 which has a conical outer surface 18 which cooperates with the conical bore 12 of the body 8 for compressing the end portion of the sheath 6. This sealing ring 10 is held in position by a ring-nut 19 screwed in a threaded bore 20 of body 8.

Preferably, the conicity of the outer wall 18 of ring 10 is slightly greater than that of the conical bore 12, so that compressional stresses in sheath 6 progressively decrease as the distance from the end of this sheath increases.

Around the body member 8 of the coupling is an anchoring ring or outer covering 9 having a shoulder 21 complementary to shoulder 17. This ring 9 directly covers the traction-withstanding armouring. In other words, ring 9 and body member 8 limit between each other an annular space 22 in which armouring 2 is housed.

In shoulders 17 and 21 are provided bores for receiving elongated anchoring elements or nail-shaped members 23 which are inserted between the wires, strands, flat or profiled strips forming the armouring layers 3 and 4, over a length substantially equal to that of the annular space 22. Through one of their ends, which is provided with a head, such nails 23 are made integral with one of the elements which constitute the coupling and particularly with body member 8 and ring 9.

FIGS. 3 A and 3 B illustrate, by way of non limitative examples, two different structures of the traction-withstanding armouring 2, in cross-section along line III—III of FIG. 2, and FIGS. 4 A and 4 B are partial cross-sectional views along line IV—IV of FIG. 2, illustrating how the nails 22 are placed between the reinforcing elements which constitute the layers of armouring 2, for the two structures illustrated by FIGS. 3 A and 3 B respectively.

As illustrated in FIG. 3 A, the armouring 2 may be formed of two wire layers 3 and 4 helically wound in opposite directions, with a large pitch.

Layers 3 and 4 are constituted by wires 24 and 25 respectively, of circular cross section.

At the level of the coupling (FIG. 4 A), the body member 8 is inserted between layer 4 and sheath 7, as hereinabove indicated, and the ring or covering 9 covers sheath 3.

The insertion of body member 8 between sheath 7 and armouring 2 results in a very slight increase in diameter of the armouring 2 and, consequently, in a spacing of wires 24 and 25 of the layers 3 and 4. Into the resulting recesses are inserted the nails 23 integral with the coupling.

In the embodiment illustrated in FIG. 3 B, the layers 3 and 4 which constitute the armouring 2 are formed of profiled strips 26 of I-shaped cross-section whose core is placed substantially along a radial direction of the pipe. Adjacent profiled elements of each layer 3 and 4 delimit substantially confined spaces 27 between each other.

As already indicated, the insertion of body member 8 between armouring 2 and sheath 7 causes a very slight increase in the diameter of armouring 2, resulting in a relative spacing of the profiled elements constituting this armouring and thus facilitating the penetration of nails 23 into the confined spaces 27.

A ring 11 (FIG. 2) integral with the casing 9 through a thread 28, bears against a shoulder 41 of body member 8.

This ring secures the tightening of the annular space 29 between body member 8 and ring 9, compressing an annular gasket 30 between shoulders 17 and 21 of body 8 and ring 9.

The armouring and coupling are made integral with each other by injecting into the annular space 22 a solififiable material which adheres, on the one hand, to the walls of the wires, strands, bands or profiled strips of layers 3 and 4, and, on the other hand, to the internal wall of covering 9, to the external wall of body member 8, shaped as a bevelled tubular plug member and to the nails 23. Because of the saw-tooth profiles of nails 23 and the portions of annular ring 9 and body member 8 defining annular space 22, a tractive force applied to the pipe results in a compression of the solidified material filling annular space 22.

The operations for securing the coupling at the end of the flexible pipe are hereinunder indicated.

Each element constituting the flexible pipe (sheaths and armourings) is cut out at a suitable length, as illustrated in FIG. 1.

In the case where the traction-withstanding layer is of the type illustrated by FIG. 3 B and when this armouoring has embedded therein an external tightening sheath formed by introducing an elastomeric material into the confined spaces 27, this embedded sheath is removed over a length corresponding to that of annular space 22 (FIG. 2).

This last operation may, for example, be achieved, under the action of a solvent for the elastomeric material, after a protecting sleeve has been inserted between armouring 2 and sheath 7.

The body member 8 is so positioned at the end of pipe 1 that the sheaths 6 and 7 and the armouring 5 are placed in the corresponding recesses of this body member and that the end of body member 8, shaped as a bevelled tubular plug member is inserted between sheath 7 and armouring 2, so as to be covered by the latter.

The internal sealing ring 10 is positioned and the compression of the end of the sheath 6 is obtained by screwing the ring-nut 19.

Through a hole 31, in communication with bore 13 and opening at the periphery of body 8, is injected into bore 13 a solidifiable material, such as Araldite (Trade name for an epoxy resin), which makes the body member 8 integral with the armouring 5.

The covering or anchoring ring 9 is placed in the position illustrated in FIG. 2.

The nails 23 are inserted into their corresponding recesses and introduced between the elements constituting the layers 3 and 4 of armouring 2, as hereinabove indicated (FIGS. 4 A or 4 B).

After the gasket 30 and ring 11 have been positioned, a solidifiable material, such as Araldite is injected into the annular space 22, through an aperture 32 opening on the external wall of ring 9, this material filling all the free spaces and adhering to the elements which constitute the armouring layers, to the nails 23, to ring 9 and body member 8.

Optionally, a spring 33 may be placed around the pipe so as to provide for a progressive flexibility of the flexible pipe sections close to the coupling.

Generally, the external diameter of the coupling being very slightly greater than that of the pipe, a conical sleeve 34 made of an elastomer is fixed by vulcanization in the vicinity of the coupling, so as to provide for a progressive variation in the diameter of the coupling and, in the case where the flexible pipe comprises an external tightening sleeve, embedded or not in the armouring 2, this sleeve provides for the continuity of the external sealing.

A threaded ring 37, indicated by a thin line in FIG. 2, cooperates with a screwing 35 of body member 8, so as to make the latter integral with a complementary element, not shown, of the coupling, secured to the end of another pipe portion.

It should be noted that with the above described embodiment of the invention, a substantial fraction of the tractive force applied to the armouring 2 is directly transmitted to the body member 8 of the coupling, through the nails 23 whose heads bear against the shoulder 17 of body member 8, thus permitting a noticeable reduction in thickness of the casing 9 and of the portion of body member 8 which is positioned under the armouring 2 through which the remaining fraction of the tractive force is transmitted.

Consequently, the external diameter of the coupling according to the invention is substantially smaller than that of prior art couplings.

FIG. 5 diagrammatically illustrates an embodiment of the nail 23. According to the invention, this nail has preferably a saw-tooth longitudinal cross-section.

Similar profiles are given to the internal wall of ring 9 and to the external wall of the part of body member 8 which is shaped as a bevelled tubular plug member (FIG. 2).

These profiles are such that the profile of a nail 23 and that of the internal surface of ring 9 or body member 8 facing this nail cooperate therewith to constitute substantially conical spaces tapered in the direction from the coupling to the flexible pipe.

With such an arrangement, it becomes possible, for the same length of the coupling, to transmit higher tractive forces than if the nails had other profiles, or, alternatively, it is possible for a given resistance of the coupling to tractive forces, to reduce the length required for this coupling.

The test diagrammatically illustrated by FIG. 6 shows the real importance of nails 23 of an adequate profile thereof.

In a box 36, illustrated in cross-section in FIG. 5, have been positioned two elements 26 forming a traction-withstanding armouring and having a I-shaped cross-section.

These elements are engaged in box 36 over a length of 120 mm.

During a first test, the box 36 has been filled with Araldite and held in a fixed position, while a tractive force was applied to the assembly of the two elements 26.

The maximum traction force was equal to 0.7 metric ton, and above this value occured a breaking in the connection between box 36 and the elements 26.

In a second test, nails 23 were positioned on both sides of each element 26.

The internal surface of box 36 and the external surface of the nails were knurled. The maximum supported force was equal to 3.7 tons.

A third test was performed, wherein the nails 23 and the internal wall of box 36 had saw-tooth wall profiles and were positioned as hereinabove indicated.

The supported tractive force was then higher than 3.85 tons and for this value a breaking of the elements 26 occurred without any deterioration of the connection between these elements and the box 36.

As shown in FIG. 7 the flexible pipe comprises at least one electric conductor 56 embedded in the traction-withstanding armouring, an aperture is provided in the shoulder 17 of body 8, so as to permit the passage of this conductor whose end portion will enter a recess 38 in the body member 8 (FIG. 2), at the level of ring 11.

In this recess the conductor will be connected to another conductor 58 located in a bore 39 of body member 8 and connected to an electric connecting device, such as a connecting plug, diagrammatically shown at 40 and embedded in the body member 8 of the coupling. In this case, during the connection of the two sections of flexible pipe, a ring 41 is, for example, positioned within body member 8, so as to provide for the continuity of the sealing at the place of the connection of the two pipe sections.

From the foregoing it becomes apparent that it is possible at any time to screw the nut 19 in order to improve the tightening between coupling and sheath 6, or, by unscrewing ring 11, to control the electrical connection in the recess 38.

Changes may be made without departing from the scope of the present invention.

For example, when sheath 7 is made of Rilsan, it is possible to provide the sealing between sheath 7 and coupling directly through sheath 7, i.e. without the need to secure a ring 16 at the end of sheath 7.

We claim:

1. A coupling for a flexible pipe provided with at least one armouring withstanding tractive and/or torsional stresses applied to the pipe, the armouring comprising at least one layer of helically wound reinforcing elongated elements, said coupling comprising in combination a tubular body member, an anchoring ring surrounding said body member on at least one portion thereof, said body member and said anchoring ring delimiting an annular space of limited length in which the end of said armouring is positioned, and a plurality of elongated anchoring elements, each of said anchoring elements being integral with at least one of said body member and said anchoring ring and positioned with a clearance, over at least a portion of the length of said annular space, between two adjacent reinforcing elements constituting said armouring, said annular space being filled with a solidified material which adheres to each of said elongated elements constituting said armouring and to said anchoring elements and to the internal surface of said annular space thereby making said armouring and coupling integral with each other.

2. A coupling according to claim 1 for a flexible pipe comprising at least one tubular element coaxial with said armouring and housed therein, wherein said body member comprises at least one bore whose internal diameter is substantially equal to the internal diameter of said armouring, said bore being designed for receiving said tubular element of said flexible pipe and including means providing for the continuity of said tubular element and for its connection to said body member.

3. A coupling according to claim 1, wherein both said annular space in a cross section taken through an axial plane of the coupling, and a generatrix of each anchoring element have saw-tooth profiles, whereby a tractive force applied to the pipe results in a compression of the solidified material filling said annular space.

4. A coupling according to claim 1, wherein said solidified material is an epoxy resin.

5. A coupling according to claim 1, wherein said body member and said external anchoring ring comprise respectively first and second shoulders limiting said annular space, said elongated anchoring elements being fixed to at least one of said shoulders, at least some of said anchoring elements rotatably securing said shoulders with each other.

6. A coupling according to claim 5 for a flexible pipe comprising at least one electric conductor embedded in said armouring, wherein the shoulder of said tubular body member is traversed by a bore communicating with said annular space and with a recess of said body member, said electric conductor entering said recess through said bore and being connected to a connecting device which provides for the continuity of said electric conductor at the location of said coupling, and wherein a detachable ring surrounding said body member provides for the sealing of said recess.

7. A coupling according to claim 1, wherein said anchor elements are longitudinally oriented.

8. A coupling according to claim 1, wherein the ends of the reinforcing elongated elements defining said armouring are positioned in said annular space with a clearance.

9. A coupling according to claim 8, wherein substantially all surfaces of said elongated anchoring elements and said reinforcing elements are in contact with said solidified material.

10. The coupling of claim 1, wherein said body member defines on an end thereof opposite said annular space a conical bore for receiving a sheath of said flexible pipe, said coupling further comprising a tubular internal tightening bevelled plug member inserted within the conical bore of said body member for securing said sheath to said coupling.

11. The coupling of claim 10, wherein said body member and said annular ring define respective shoulders engaging one another, said annular space being located on one side of said shoulders, said coupling further comprising a securing ring between said body member and said annular ring on the side of said coupling opposite said annular space.

12. A coupling for flexible pipe provided with at least one armouring composed of at least one layer of helically wound reinforcing elements, said coupling comprising a tubular body member, an anchoring ring surrounding said tubular body member along at least a portion thereof, said tubular body member and said anchoring ring defining an annular space therebetween in which the ends of said reinforcing elements are positioned, and a plurality of elongated anchoring elements, each of said anchoring elements being integral with at least one of said body member and said anchoring ring, each anchoring element being positioned over at least a portion of the length of said annular space between two adjacent reinforcing elements constituting said armouring, said annular space being filled with a solidified material adhering to each of said elongated elements constituting said armouring and to said anchoring elements and to the internal surface of said annular space thereby making said armouring and coupling integral with each other, said anchoring elements and said reinforcing elements being positioned in said annular space with a clearance being maintained between said anchoring elements and said reinforcing elements over at least a portion of the length of said annular space so that substantially all surfaces of said anchoring elements and said reinforcing elements in said portion are in contact with said solidified material.

13. A coupling according to claim 12 wherein said anchoring elements are longitudinally oriented.

14. A coupling according to claim 12 for a flexible pipe comprising at least one tubular element coaxial with said armouring and housed therein, wherein said body member comprises at least one bore whose internal diameter is substantially equal to the internal diameter of said armouring, said bore being designed for receiving said tubular element of said flexible pipe and including means providing for the continuity of said tubular element and for its connection to said body member.

15. A coupling according to claim 12, wherein both said annular space in a cross section taken through an axial plane of the coupling, and a generatrix of each anchoring element have saw-tooth profiles, whereby a tractive force applied to the pipe results in a compression of the solidified material filling said annular space.

16. A coupling according to claim 12, wherein said solidified material is an epoxy resin.

17. A coupling according to claim 12, wherein said body member and said external anchoring ring comprise respectively first and second shoulders limiting said annular space, said elongated anchoring elements being fixed to at least one of said shoulders, at least some of said anchoring elements rotatably securing said shoulders with each other.

18. A coupling according to claim 12 for a flexible pipe comprising at least one electric conductor embedded in said armouring, wherein the shoulder of said tubular body member is traversed by a bore communicating with said annular space and with a recess of said body member, said electric conductor entering said recess through said bore and being connected to a connecting device which provides for the continuity of said electric conductor at the location of said coupling, and wherein a detachable ring surrounding said body member provides for the sealing of said recess.

19. The coupling of claim 12, wherein said body member defines on an end thereof opposite said annular space a conical bore for receiving a sheath of said flexible pipe, said coupling further comprising a tubular internal tightening bevelled plug member inserted within the conical bore of said body member for securing said sheath to said coupling.

20. The coupling of claim 19, wherein said body member and said annular ring define respective shoulders engaging one another, said annular space being located on one side of said shoulders, said coupling further comprising a securing ring between said body member and said annular ring on the side of said coupling opposite said annular space.

21. A coupling for flexible pipe provided with at least one armouring composed of at least one layer of helically wound reinforcing elements, said coupling comprising a tubular body member, an anchoring ring surrounding said tubular body member along at least a portion thereof, said tubular body member and said anchoring ring defining an annular space therebetween in which the ends of said reinforcing elements are positioned, and a plurality of elongated anchoring elements, each of said anchoring elements being integral with at least one of said body member and said anchoring ring, each anchoring element being positioned over at least a portion of the length of said annular space between two adjacent reinforcing elements constituting said armouring, said annular space being filled with a solidified material adhering to each of said elongated elements constituting said armouring and to said anchoring elements and to the internal surface of said annular space thereby making said armouring and coupling integral with each other, said reinforcing elements and said anchoring elements being maintained in said annular space so that substantially all surfaces of said anchoring elements and said reinforcing elements along at least a portion of the length of said annular space are in contact with said solidified material.

22. The coupling of claim 21, wherein said body member defines on an end thereof opposite said annular space a conical bore for receiving a sheath of said flexible pipe, said coupling further comprising a tubular internal tightening bevelled plug member inserted within the conical bore of said body member for securing said sheath to said coupling.

23. The coupling of claim 22, wherein said body member and said annular ring define respective shoulders engaging one another, said annular space being located on one side of said shoulders, said coupling further comprising a securing ring between said body member and said annular ring on the side of said coupling opposite said annular space.

24. A flexible pipe having a coupling thereon comprising: a flexible pipe including an armouring comprising at least one layer of helically wound reinforcing elongated elements; and a coupling attached to said flexible pipe, said coupling comprising a tubular body member, an anchoring ring surrounding said tubular body member along at least a portion thereof, said tubular body member and said anchoring ring defining an annular space therebetween in which the ends of said reinforcing elements are positioned, and a plurality of elongated anchoring elements, each of said anchoring elements being integral with at least one of said body member and said anchoring ring, each anchoring element being positioned over at least a portion of the length of said annular space between two adjacent reinforcing elements constituting said armouring, said annular space being filled with a solidified material adhering to each of said elongated elements constituting said armouring and to said anchoring elements and to the internal surface of said annular space thereby making said armouring and coupling integral with each other, said reinforcing elements and said anchoring elements being maintained in said annular space so that substantially all surfaces of said anchoring elements and said reinforcing elements along at least a portion of the length of said annular space are in contact with said solidified material.

25. The apparatus of claim 24, wherein said flexible pipe includes at least one tubular element coaxial with and housed within said armouring, the body member of said coupling defining at least one bore whose internal diameter is substantially equal to the internal diameter of said armouring, said bore receiving the tubular element of said flexible pipe.

26. The apparatus of claim 25 further comprising means for sealing the tubular body member of said coupling to the tubular element of said flexible pipe along said bore.

27. The apparatus of claim 24, wherein said annular space in a cross section taken through an axial plane of said coupling and a generatrix of each anchoring element have saw-tooth profiles whereby a tractive force applied between said flexible pipe and said coupling causes the compression of the solidified material in said annular space.

28. The apparatus of claim 24, wherein said body member defines on an end thereof opposite said annular space a conical bore for receiving a sheath of said flexible pipe, said coupling further comprising a tubular internal tightening bevelled plug member inserted within the conical bore of said body member for securing said sheath to said coupling.

29. The apparatus of claim 28, wherein said body member and said annular ring define respective shoulders engaging one another, said annular space being located on one side of said shoulders, said coupling further comprising a securing ring between said body member and said annular ring on the side of said coupling opposite said annular space.

30. A coupling for a flexible pipe provided with at least one armouring composed at least of one layer of helically wound reinforcing elongated elements, said coupling comprising a tubular body member, an anchoring ring surrounding said tubular body member along at least a portion thereof, said body member and said annular ring defining an annular space therebetween of limited length for receiving the ends of the reinforcing elongated elements defining said armouring, and a plurality of elongated anchoring elements, each anchoring element being integral with at least one of said body member and said anchoring ring and positioned with a clearance over at least a portion of the length of said annular space between two adjacent reinforcing elements, said annular space communicating by means of a conduit with the exterior of said coupling so that a solidifiable material can be introduced into said annular space, said annular space, said anchoring elements and said reinforcing elements being so sized in at least a portion of the length of said annular space so that solidifiable material can contact substantially all surfaces of said reinforcing elements and said anchoring elements along said portion of said annular space.

31. The coupling of claim 30, wherein said body member defines on an end thereof opposite said annular space a conical bore for receiving a sheath of said flexible pipe, said coupling further comprising a tubular internal tightening bevelled plug member inserted within the conical bore of said body member for securing said sheath to said coupling.

32. The coupling of claim 31, wherein said body member and said annular ring define respective shoulders engaging one another, said annular space being located on one side of said shoulders, said coupling further comprising a securing ring between said body member and said annular ring on the side of said coupling opposite said annular space.

* * * * *